Feb. 20, 1923.

F. ILSEMANN.
LOCKING NUT.
FILED JUNE 11, 1912.

1,445,955.

Attest:
Ewd L. Tolson
H. L. Alden.

Inventor:
Friedrich Ilsemann,
By Spear, Middleton, Donaldson & Spear
Attys

Patented Feb. 20, 1923.

1,445,955

UNITED STATES PATENT OFFICE.

FRIEDRICH ILSEMANN, OF BREMEN-HORN, GERMANY.

LOCKING NUT.

Application filed June 11, 1912. Serial No. 703,038.

*To all whom it may concern:*

Be it known that I, FRIEDRICH ILSEMANN, a citizen of the free city of Bremen, Germany, residing at 60 Am Brahmkamp, in the city of Bremen-Horn, in the German Empire, have invented new and useful Improvements in Locking-Nuts, of which the following is a specification.

The present invention relates to locking nuts having a conical extension provided with slits, which extension when the screw nut is tightened rests in a correspondingly conical recess in the locking member whereby the slit cone is compressed and the nut locked. Locking nuts are already known in which the nut is provided with a slit cone which on the nut being tightened, is forced into a corresponding recess in a washer or in a second nut whereby the jaws of the slit cone are firmly clamped on the thread of the screw bolt. In all such nuts, however, the defect exists that after frequently being tightened or even after being tightened once only the slit cone is jumped up or deformed. This is due mainly to the fact that the jaws of the slit cone which must be regarded as beams firmly clamped on one side, are yielding on their free end only, so that it is only here that they are pressed against and locked on the thread while at their upper clamped end they yield but very little or not at all so that the external pressure produces a jumping up or deformation in the length of the jaws. By the irregular yielding and application of the jaws of the slit cone against the thread of the screw bolt the defects also arise that as the clamping jaws are clamped on the thread for a small portion of their length only and furthermore only a small surface is in contact with the locking member the locking connection is adversely affected while by the modification in the form of the clamping jaws the screw thread is distorted.

The object of the present invention is to avoid these defects and to provide a locking nut of great security, strength and durability. In the first place this result is attained owing to the fact that the nut portion is provided with wrench receiving sides of the same or minor diameter than the slit cone so that the elasticity of the jaws of the slit cone is more effective and uniform throughout their entire length and when the nut is tightened the jaws of the cone are clamped uniformly on the thread of the screw bolt throughout almost their entire length. This action is still further increased owing to the fact that in accordance with the invention the slits in the slit cone project beyond said cone and are located in the corners of the nut proper whereby the latter is divided into a corresponding number of resilient portions.

As with the novel construction the resiliency is mainly furnished by the segments of the nut head it is not necessary to consider the resiliency in calculating the pitch of the cone so that the slit cone can be formed with a sharp pitch so that the cheeks are themselves very stiff and as soon as the cone bears against the locking member on tightening the nut it develops a powerful radial pressure for locking purposes.

Owing to the strong construction of the cheeks of the cone these cheeks and the thread are not deformed.

An embodiment of the invention is illustrated in the accompanying drawing, in which.

Figure 2:
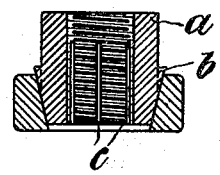
Figure 2 is a vertical section with the locking member part.
Figure 3:
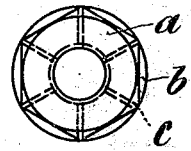
Figure 3 is a plan.

As shown very clearly in Figure 2 in particular the nut proper $a$ provided with the wrench receiving sides, is of the same or minor diameter than the base circle of the slit cone $b$. The slits $c$ of this cone are located in the same planes as the edges of the nut proper and are prolonged beyond the slit cone into the nut proper $a$ so that to a certain height it is divided into a number of flat resilient parts or segments.

Figure 1:
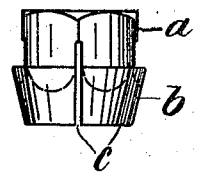
Figure 1 shows the nut in elevation.

It will of course be understood that the nut proper as shown in broken lines in Figure 1 might be continued in the slit cone, in which case the latter would be somewhat weakened in its foot portion and would merge directly into the nut. With this construction the simplest method of formation is to turn a cone on an ordinary piece of commercial hexagonal material and then effect the slitting after the thread has been formed.

What I claim and desire to secure by Letters Patent of the United States is:

A lock-nut comprising in combination a polygonal portion provided with more than five wrench receiving sides, a conical extension of said polygonal portion having its base adjacent to said polygonal portion and of such diameter that the polygonal portion is completely located within the circle of said base, said conical extension having slits situated in alinement with and extending up into the edges of said polygonal portion so that the lock-nut, down from a certain distance below the free edge of said polygonal portion, is divided into as many elastic flaps as there are flat parts of the polygonal portion, substantially as described and shown and for the purpose set forth.

In testimony whereof I have signed my name to this specification in the presence of two subscribing witnesses.

FRIEDRICH ILSEMANN.

Witnesses:
    FREDERICK HAGERMANN,
    WILHELM STRUPS.